United States Patent [19]

Marola et al.

[11] 3,820,640
[45] June 28, 1974

[54] UNIDIRECTIONAL CLUTCH
[75] Inventors: Americo E. Marola, Torrington; Gerard W. Gehrke, Litchfield, both of Conn.
[73] Assignee: The Torrington Company, Torrington, Conn.
[22] Filed: Aug. 31, 1972
[21] Appl. No.: 285,250

Related U.S. Application Data
[63] Continuation-in-part of Ser. No. 140,092, May 4, 1971, Pat. No. 3,746,136.

[52] U.S. Cl. ............................................. 192/45
[51] Int. Cl. .................................... F16d 15/00
[58] Field of Search ............ 192/44, 45; 188/82.84

[56] References Cited
UNITED STATES PATENTS

| 521,942 | 6/1894 | Swan | 188/82.84 |
|---|---|---|---|
| 1,583,530 | 5/1926 | Lavaud | 192/45 |
| 2,079,527 | 5/1937 | Rauen | 192/45 |
| 2,292,988 | 8/1942 | Bloomfield et al. | 192/45 |
| 2,684,139 | 7/1954 | Lewis | 192/45 |
| 3,012,645 | 12/1961 | Gensheimer et al. | 192/45 |
| 3,103,998 | 9/1963 | Watson | 192/45 |
| 3,249,186 | 5/1966 | Kluwe | 192/45 |
| 3,482,667 | 12/1969 | Hein | 192/45 |
| 3,623,581 | 11/1971 | Livezey | 192/45 |

Primary Examiner—Allan D. Herrmann
Attorney, Agent, or Firm—Frank S. Troidl

[57] ABSTRACT

A one-way clutch including an outer member containing a bore surrounding a spaced inner member with a full complement of rollers in side-to-side engagement located around the inner member between the two members. One or more control members may be spaced between the rollers to urge the rollers in a given rotary direction against wedging ramps provided on the surfaces of one of the members to engage the clutch for driving purposes.

The outer member may have flanges or washers extending radially inwardly to overlap the longitudinal ends of the inner member.

2 Claims, 14 Drawing Figures

UNIDIRECTIONAL CLUTCH

BACKGROUND OF THE INVENTION

This is a continuation-in-part of our co-pending application Ser. No. 140,092, filed May 4, 1971, now U.S. Pat. No. 3,746,136, entitled "UNIDIRECTIONAL CLUTCH."

The invention relates generally to one-way or over-running clutches and more specifically to one-way clutches of the roller-type such as disclosed in U.S. Pat. No. 3,184,020 issued to C. F. Benson et al.

A conventional one-way clutch of the roller-type includes an outer member containing a bore surrounding a spaced inner member with a series of rollers located in the space between the two members with one of the members carrying a cam or wedging ramp for each roller for wedging or locking the rollers between the members when the clutch is engaged for driving purposes. This conventional clutch has its rollers spaced apart with an individual spring or other control means located between each pair of adjacent rollers to urge an individual roller against its wedging ramp toward a locking position. Since the rollers are spaced apart, the number of rollers available for locking purposes is reduced, as compared to using a full complement of rollers, thus reducing the torque capacity of a clutch.

SUMMARY OF THE INVENTION

The principal object of this invention is to provide an improved one-way clutch of the roller type which has a substantially increased torque transmitting capacity and is less costly to manufacture compared to prior art clutches.

Other important objects of this invention are: to provide a roller-type one-way clutch using a full complement of rollers; to provide a roller-type one-way clutch using either none or a minimal number of roller control springs compared to conventional clutches; and to provide a roller-type one-way clutch using a novel combination roller and spring.

In general, the foregoing objects are attained in a clutch containing a full complement of rollers with the option of using either none or a few control elements for urging the rollers toward locking positions. Normally, if control elements are used, there is only one or two control elements and the forces applied by the control elements to the rollers will be transmitted between the adjacent rollers by having the rollers engaged in side-to-side contact.

BRIEF DESCRIPTION OF THE DRAWING

The invention is described in connection with the accompanying drawings wherein.

DESCRIPTION OF THE PREFERRED EMBODIMENTS

Figure 1:
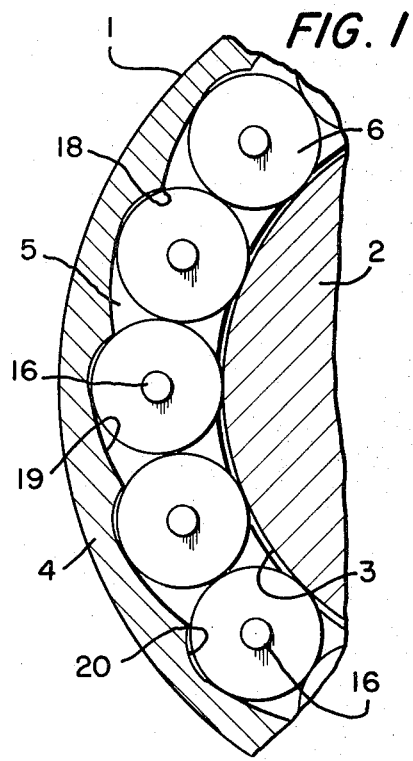
FIG. 1 is a fragmentary view of a diametrical section of an embodiment of a one-way clutch.
Figure 2:
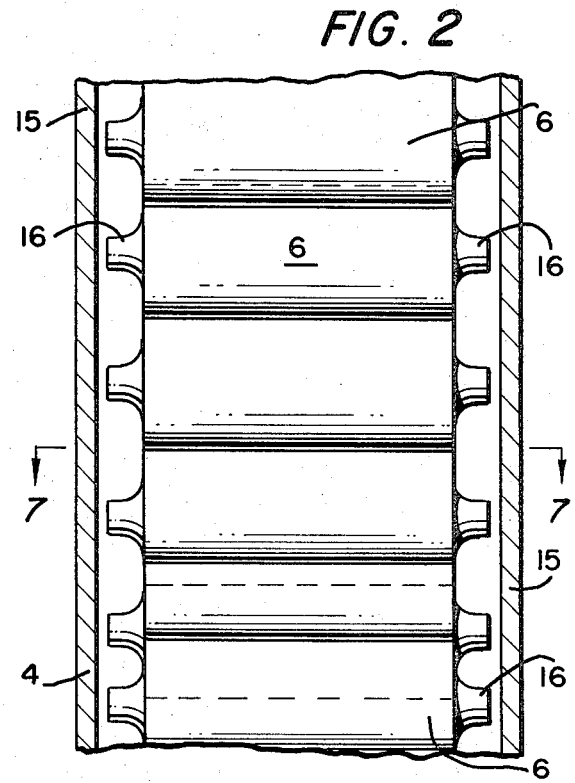
FIG. 2 is a fragmentary view looking at the inside of the clutch with the inner rotating member omitted to illustrate the clutch rollers.

The roller clutch 1 of FIGS. 1 and 2 includes an inner shaft member 2 having a cylindrical periphery 3 surrounded by an outer hollow member 4 containing a bore 5 receiving the shaft member 2 in spaced relationship. A series of engaging rollers 6 are positioned in the bore 5 between the members 2 and 4.

Figure 7:
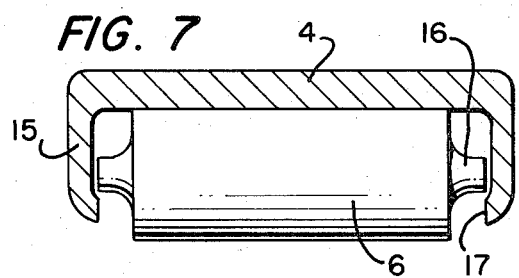
FIG. 7 is a section taken on line 7—7 in FIG. 2.

The rollers 6 are held in place between the members 2 and 4 by side flanges 15 provided on the ends of the outer member 4 to project over the ends of the rollers 6. In addition, the rollers 6 should be held in place by a suitable retainer means to prevent them from falling out before the inner member 2 is assembled within the rollers. In the drawing, the ends of the rollers are reduced to small trunnions 16 and the side flanges 15 carry lips 17 that are turned inwardly over the roller trunnions 16, as shown in FIG. 7.

The interior surface of the hollow member 4 carries a series of wedging teeth 18 spaced around its axis and arranged so that a wedging tooth 18 cooperates with each roller. Each wedging tooth includes a front wedging ramp or surface 19 and a rear non-wedging surface or stop 20. A small angle is formed between the planes tangent to each roller 6 where the roller contacts the wedging ramp 19 and the periphery 3. Each roller 6 will wedge between the wedging ramp 19 and the periphery 3 of the shaft 2, when the roller 6 is forced in a counterclockwise direction, looking at FIG. 1. This wedging of the roller 6 can be caused by either the shaft 2 attempting to rotate in a counterclockwise direction or the outer member 4 attempting to rotate clockwise. The thus wedged rollers 6 connect the clutch together in driving engagement.

The tangential plane at the rear non-wedging stop or surface 20 forms a much larger angle with a plane tangential to the shaft periphery 3 adjacent the non-wedging stop 20 so that a roller 6 cannot be pinched or wedged between the two members 2 and 4 when rolled against the non-wedging stop 20. At this time, the clutch is disengaged or in an overrunning condition. The rotation direction of the clutch members in the overrunning condition will depend on which member is the driving member. When overrunning, the shaft 2 can rotate clockwise while the outer member 4 can rotate counterclockwise, as shown in FIG. 1.

The first embodiment in FIGS. 1 and 2 does not contain any control members such as springs for urging the rollers 6 in the wedging direction. Applicant has found that control members are not necessary in certain applications, particularly when the dimensions are controlled accurately.

As soon as the torque on the clutch acts in a roller wedging direction, it is only necessary for a single roller to be wedged into a locking position. This wedged roller 6 acts to force the other rollers 6 toward a wedged position in two ways. First, since the rollers 6 are in contact with each other, the movement of one will be transmitted throughout the entire group of rollers. Second, the wedged roller will attempt to displace the inner and outer member 2 and 4 from a concentric position which will cause the rollers diametrically opposite the wedged roller to be pinched or wedged sooner than they might be normally. This action of the rollers in wedging might be characterized as a chain-type or sequential type of action. The position of the rollers are interdependent on each other and, thus, the wedging of a single roller causes all of the rollers to move into wedging positions. In order for the first embodiment to operate properly, it has been found that the dimensions of the various elements of the clutch should be reasonably accurate.

Figure 3:
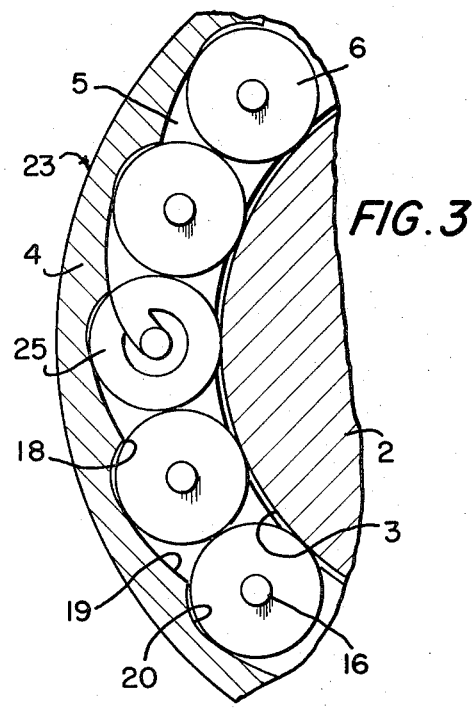
FIG. 3 is a fragmentary section similar to FIG. 1 of a second embodiment.
Figure 4:
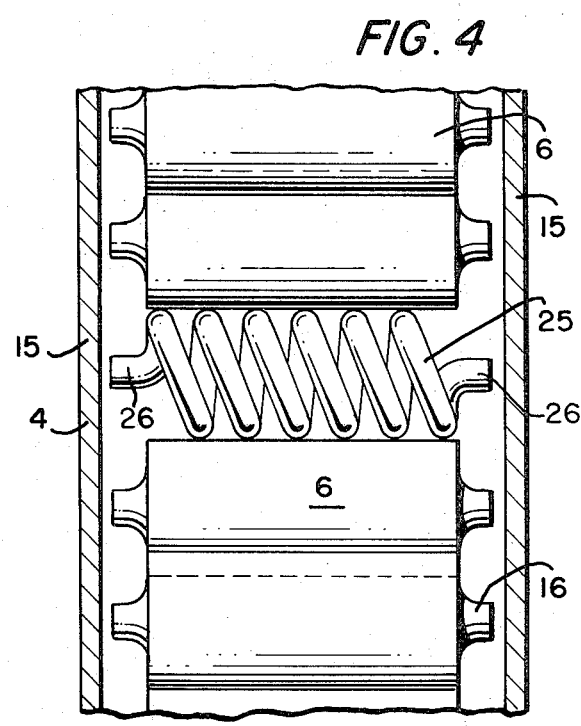
FIG. 4 is a fragmentary section similar to FIG. 2 of the second embodiment.

In some cases, it is desirable to use one or more control elements for urging the rollers 6 toward the wedging position. A second embodiment 23 of clutch is shown in FIGS. 3 and 4 wherein the control element is a coiled spring roller 25 having a relaxed diameter which is slightly larger than the diameter of the rollers 6. Due to its larger size, the spring rollers 25 will abut the rear non-wedging stop 20 of the adjacent wedging tooth 18 and urge the rollers against the front wedging ramps 19 of the teeth 18. In addition, the oversize spring roller 25 will attempt to force the shaft member 2 toward an eccentric position away from the spring roller 25 to further aid the rollers 6 diametrically opposite of the spring roller 25 in wedging or locking the shaft 2 when attempting to rotate in its locking direction. The spring roller 25 will also act like the other rollers 6 in rolling against the front wedging ramps 19 of the wedging teeth 18 to serve in locking the shaft 2 against rotation in its locking direction. The spring roller 25 is also shown in FIG. 4 as having trunnion ends 26, like the rollers 6. It should be understood that the rollers 6 and the spring 25 can be retained by other retaining means than that shown in the drawings.

Figure 5:
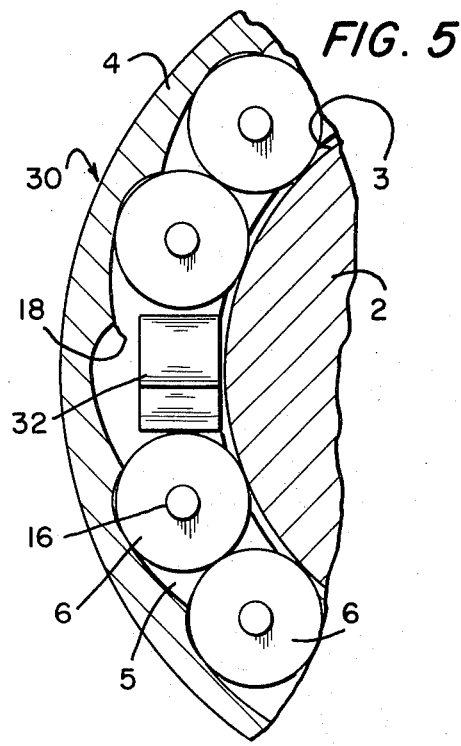
FIGS. 5 and 6 are views similar to FIGS. 1 and 2 of a third embodiment.
Figure 6:
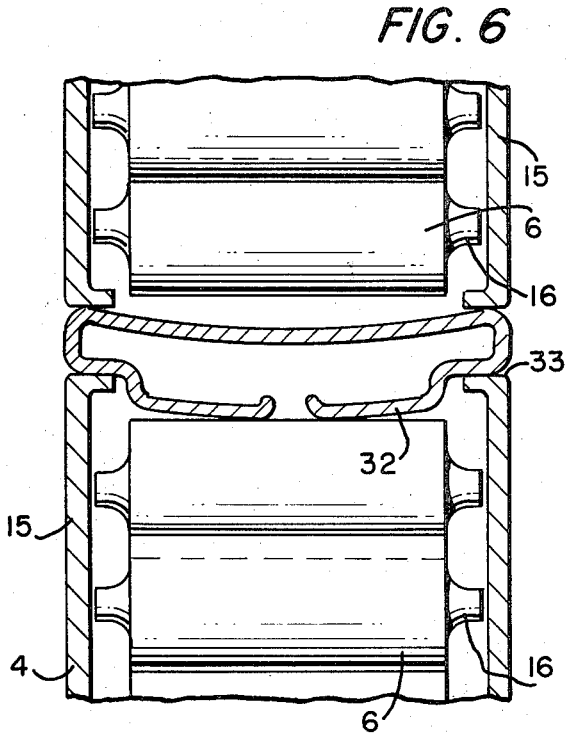

In the third embodiment 30 in FIGS. 5 and 6, the spring roller 25 is replaced by a leaf spring 32 located between the members 2 and 4 and anchored in slots 33 provided in the side flanges 15 attached to the outer member 4. The spring 32 is located in the set of rollers 6 where a roller would normally be located and is arranged to urge the rollers 6 in a given rotary direction wherein they are urged against the front wedging ramps 19 of the wedging teeth 18. Since the rollers 6 engage each other, in side-to-side contact, a single spring 32 will force more than one of the rollers 6 against their respective wedging teeth 18.

In some cases, it may be desirable to have two or three of the springs 32 located around the axis of the clutch at equal angular spaced relationship.

Figure 8:
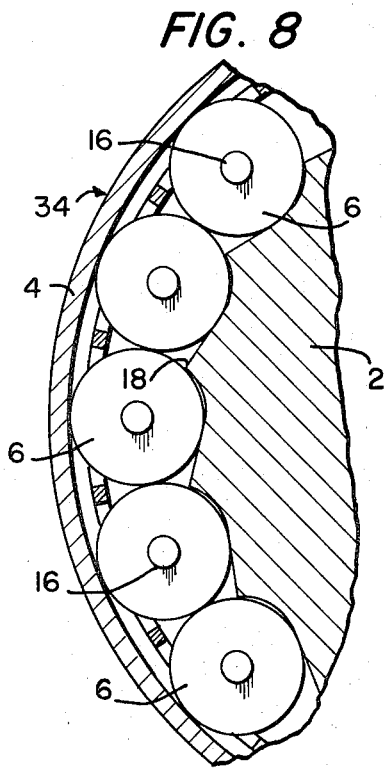
FIGS. 8 and 9 are views similar to FIG. 1 of fourth and fifth embodiments.

A fourth embodiment 34 of the clutch is shown in FIG. 8. In this fourth embodiment 34, the wedging teeth 18 are located on the periphery of the inner shaft 2 instead of on the outer member 4 as is true in the first embodiment in FIGS. 1 and 2. Otherwise, the structure of the fourth embodiment 34 is identical with the first embodiment.

Figure 9:
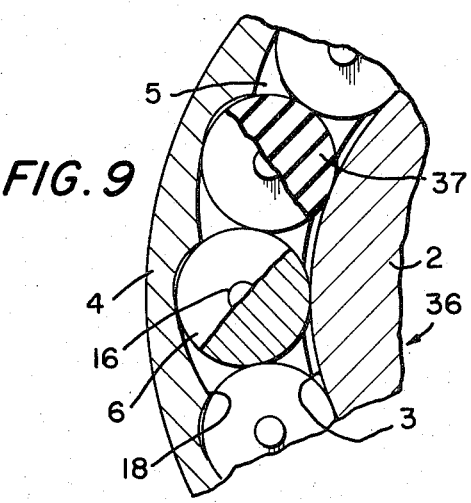

The fifth embodiment 36 in FIG. 9 replaces one of the rollers 6 with a resilient elastic roller 37 which is slightly larger than the rollers 6 and acts much like the coil spring roller 25 in the second embodiment. The resilient roller 37 can be made of rubber or a similar elastomeric material.

A further example of a control member is the use of a hollow steel roller with sufficient elasticity or springiness to act similar to the coil spring roller 25 in the second embodiment in FIGS. 3 and 4 or the elastic resilient roller in FIG. 9.

The modifications of our invention shown in FIGS. 10 through 13 provide the user of the clutch with many advantages. These modifications can be shipped in one unit; and the rollers are kept in the proper position between the two races and held against axial movement.

Figure 10:
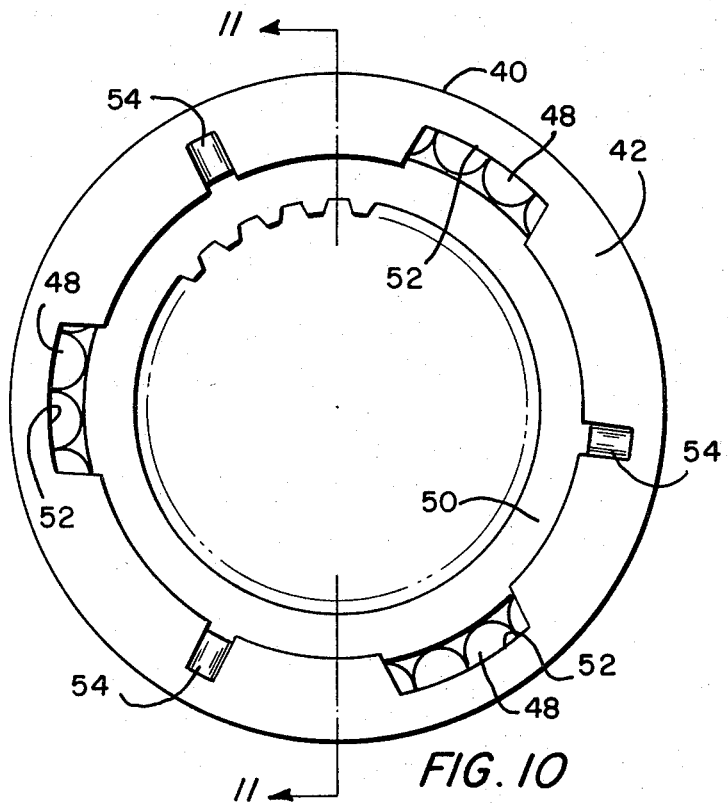
FIG. 10 is an elevational view of a further modification of our invention.
Figure 11:
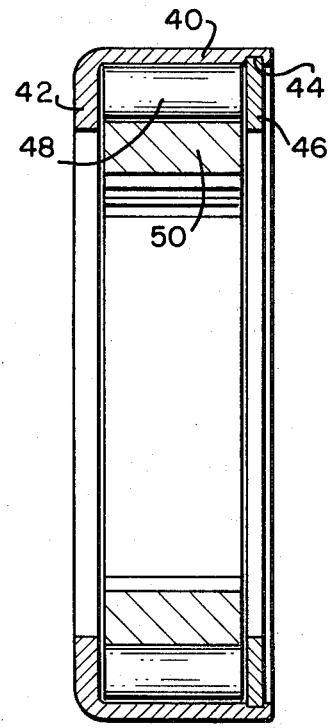
FIG. 11 is a sectional view taken along lines 11—11 of FIG. 10.

Referring specifically to FIG. 10 and FIG. 11, the outer race 40 has an integral inwardly extending flange 42 at one longitudinal end. The other longitudinal end of the outer race includes an annular groove 44. An annular washer 46 is fitted within the annular groove 44. The entire inner race is shorter than the outer race. The washer holds the rollers 48 and the inner race 50 against axial movement. This insures the proper axial position of the inner race within the clutch after assembly in the torque converter. Also, a unit assembly is provided for ease in handling, shipping, and installation.

As shown in FIG. 10 three circumferentially spaced apart grooves 52 are provided through flange 42 for lubrication. Leaf springs 54, similar to leaf springs 32 of FIG. 6, may be used to urge a group of rollers against the ramp in the outer race 40.

Figure 12:
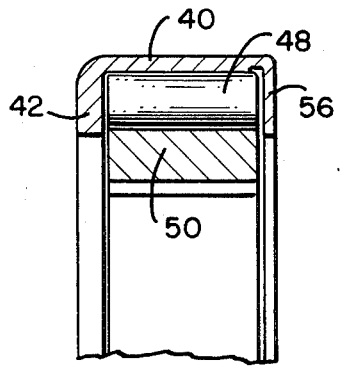
FIG. 12 is a fragmentary sectional view of a further modification of our invention.

In the embodiment in FIG. 12, instead of a washer an integral flange 56, extending radially inwardly and overlapping the rollers 48 and inner race 50, retain the rollers and inner race against axial movement.

Figure 13:
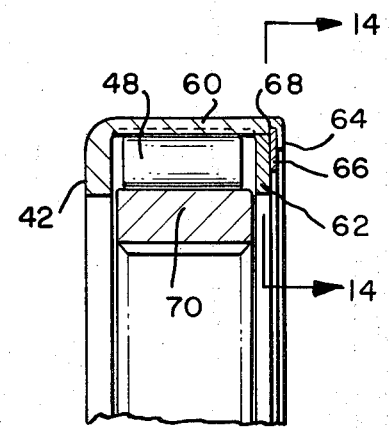
FIG. 13 is a fragmentary sectional view of still a further modification and FIG. 14 is a view taken along lines 14—14 of FIG. 13.
Figure 14:
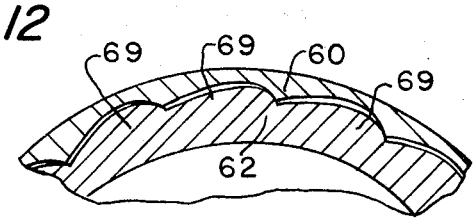

In the embodiment of FIG. 13 and FIG. 14, an independent annular washer 62 is held in place by the short integral flange 64 and a reinforcing washer 66 fitted into annular groove 68 formed in the outer race 60. The independent washer extends radially inwardly sufficiently to overlap the longitudinal end of the inner race 70.

The outer periphery of the independent washer 62 is scalloped in one or more areas 69 to match the shape of the ramps of the outer race 60. This matching locates the washer circumferentially so that the spring supporting notches are in the proper registration.

The inner race 70 is longer than the rollers 48. This prevents the scalloped washer 62 from moving inward and binding the roller ends.

Although several embodiments of the invention are illustrated and described in detail, it will be understood that the invention is not limited simply to these embodiments, but contemplates other embodiments and variations which utilize the concepts and teachings of this invention.

We claim:

1. A one-way clutch comprising:
   a first member containing an internal bore;
   a second member located within said bore and carrying an external periphery spaced from the interior of said bore, the entire second member being shorter than the first member and having a constant outside diameter throughout its length;
   a series of rollers located around said second member between said members with a plurality of said rollers engaging each other whereby a force applied to one of the engaged rollers in a rotary direction will be transmitted to an adjacent roller through the engagement between said rollers, the first member carrying a series of wedging surfaces for cooperating with the rollers to wedge and lock said rollers between said members when said rollers are urged in a given direction;

said first member having an integral radially inwardly extending portion at one longitudinal end; an inner washer with at least a segment of the outer periphery shaped to fit into the wedging surfaces; a reinforcing washer for retaining the inner washer in the first member, the integral radially extending portion of the first member and the inner washer overlapping the longitudinal ends of the second member, whereby the entire second member is axially properly positioned within the first member to provide a unit assembly.

2. A one-way clutch in accordance with claim 1 wherein the second member is longer than the rollers.

* * * * *